(12) United States Patent
Ripley

(10) Patent No.: US 8,701,970 B2
(45) Date of Patent: Apr. 22, 2014

(54) METHOD OF FORMING AND ASSEMBLY OF METAL AND CERAMIC PARTS

(75) Inventor: Edward B. Ripley, Knoxville, TN (US)

(73) Assignee: Babcock & Wilcox Technical Services Y-12, LLC, Oak Ridge, TN (US)

( * ) Notice: Subject to any disclaimer, the term of this patent is extended or adjusted under 35 U.S.C. 154(b) by 0 days.

(21) Appl. No.: 13/162,614

(22) Filed: Jun. 17, 2011

(65) Prior Publication Data

US 2011/0272080 A1  Nov. 10, 2011

Related U.S. Application Data

(63) Continuation of application No. 12/952,283, filed on Nov. 23, 2010, now Pat. No. 8,061,580, which is a continuation of application No. 11/287,558, filed on Nov. 23, 2005, now Pat. No. 7,857,193.

(51) Int. Cl.
*B23K 31/02* (2006.01)
*B22F 3/26* (2006.01)

(52) U.S. Cl.
USPC .......... 228/122.1; 428/547; 428/469; 419/27; 419/47

(58) Field of Classification Search
USPC ......... 428/469, 472, 701, 702, 547, 550, 566, 428/567; 228/122.1; 156/89.11, 89.28, 155, 156/60, 160; 419/27, 47
See application file for complete search history.

(56) References Cited

U.S. PATENT DOCUMENTS

| | | | |
|---|---|---|---|
| 3,284,174 A | 11/1966 | Zimmer | |
| 4,412,643 A * | 11/1983 | Sato et al. | 228/221 |
| 4,588,551 A | 5/1986 | Iijima et al. | |
| 4,732,780 A | 3/1988 | Mitoff et al. | |
| 4,857,411 A | 8/1989 | Yamaguchi et al. | |
| 4,911,718 A | 3/1990 | Lee et al. | |
| 5,305,507 A | 4/1994 | Dvorsky et al. | |
| 5,654,106 A * | 8/1997 | Purnell et al. | 428/547 |
| 5,676,907 A | 10/1997 | Ritland et al. | |
| 5,771,567 A * | 6/1998 | Pierce et al. | 29/600 |
| 6,193,928 B1 | 2/2001 | Rauscher et al. | |
| 6,635,357 B2 | 10/2003 | Moxson et al. | |
| 6,776,860 B2 * | 8/2004 | Arai et al. | 156/89.11 |
| 7,191,885 B2 | 3/2007 | Kienzle et al. | |
| 7,270,888 B2 * | 9/2007 | De La Prieta et al. | 428/469 |
| 2002/0025472 A1 * | 2/2002 | Komori et al. | 429/118 |
| 2004/0043051 A1 | 3/2004 | Pilliar et al. | |
| 2004/0243133 A1 | 12/2004 | Materna | |
| 2005/0098609 A1 * | 5/2005 | Greenhut et al. | 228/122.1 |

FOREIGN PATENT DOCUMENTS

WO   WO 2004020366   *   3/2004   ............ C04B 37/00

* cited by examiner

*Primary Examiner* — Jessee Roe
*Assistant Examiner* — Michael Aboagye
(74) *Attorney, Agent, or Firm* — Michael J. Renner, Esq.; Luedeka Neely Group, P.C.

(57) ABSTRACT

A method of forming and assembling at least two parts together that may be metal, ceramic, or a combination of metal and ceramic parts. Such parts may have different CTE. Individual parts that are formed and sintered from particles leave a network of interconnecting porosity in each sintered part. The separate parts are assembled together and then a fill material is infiltrated into the assembled parts using a method such as capillary action, gravity, and/or pressure. The assembly is then cured to yield a bonded and fully or near-fully dense part that has the desired physical and mechanical properties for the part's intended purpose. Structural strength may be added to the parts by the inclusion of fibrous materials.

16 Claims, 3 Drawing Sheets

METHOD OF FORMING AND ASSEMBLY OF METAL AND CERAMIC PARTS

CROSS REFERENCES TO RELATED APPLICATIONS

This application is a Continuation of U.S. patent application Ser. No. 12/952,283 filed 11/23/2010, entitled "METHOD OF FORMING AND ASSEMBLY OF METAL PARTS AND CERAMIC PARTS," allowed as U.S. Pat. No. 8,061,580. This application is a Continuation of U.S. patent application Ser. No. 11/287,558 filed Nov. 23, 2005, entitled: "METHOD OF FORMING AND ASSEMBLY OF PARTS," allowed as U.S. Pat. No. 7,857,193. This application claims a priority date of Nov. 23, 2005, which is the filing date of U.S. patent application Ser. No. 11/287,558, allowed as U.S. Pat. No. 7,857,193. U.S. patent application Ser. No. 12/952,283 and U.S. patent application Ser. No. 11/287,558 are herein incorporated by reference in their entirety.

GOVERNMENT RIGHTS

The U.S. Government has rights to this invention pursuant to contract number DE-AC05-00OR22800 between the U.S. Department of Energy and Babcock & Wilcox Technical Services Y-12, LLC.

FIELD

This disclosure is generally related to the assembly of parts and more particularly to the forming and assembly of at least two metal and/or ceramic parts or parts.

GENERAL BACKGROUND

In the present state of the art, various "3-D printers" use a process that makes parts by spraying glue down and sprinkling metal powder into the glue. The part is built up in layers to form a three-dimensional part which is baked to remove the glue and then sintered to form a structural part. A part formed in this manner is not fully dense (approximately 60% open and 40% dense) at this point in the process and has a very irregular surface, with open and interconnecting porosity. The part is then placed in a container holding a molten metal that has a lower melting point. The part draws the melted metal into the part by wicking and capillary action. The metal drawn into the part is then allowed to solidify.

The present state of the art is limited to forming a single part from metal and does not adequately address the assembly of two or more parts in any form or the assembly of parts that have different coefficients of thermal expansion (CTE). One important deficiency in the present state of the art is the inability to assemble two or more parts together to produce a single part that does not result in typical problems of reduced strength at the bond area between the original parts. These problems at the bond area are exacerbated where manufacturing requirements or limitations present the situation where two or more small parts must be combined to produce a single larger part having the same physical properties, such as strength and flexibility, as each of the individual smaller parts. Parts having different CTE present special difficulties and needs when being assembled together. If the means used to bind the parts together cannot accommodate the different CTE, the connection between the two parts may break or either one or both of the parts may break during heating or cooling.

SUMMARY

The invention addresses the above needs. What is provided is a method of assembling two or more parts together that may be metal, ceramic, metal and ceramic parts, or parts of various materials that have different CTE. Individual parts are formed and sintered to increase their structural integrity from particles or other materials in a manner that leaves a network of interconnecting porosity in each sintered part. Alternatively, the parts need not be sintered if they consist of perforated metal and/or perforated ceramic parts, or if they consist of metal foam or ceramic foam having the proper amount of open and interconnecting porosity. Both sintered and nonsintered parts may optionally incorporate fiber materials between the parts to form a laminate or incorporate fiber materials by wrapping the fiber materials around the parts in order to increase the structural strength of the part. Typically, the separate parts are assembled together and then a fill material is infiltrated into the assembled parts. The infiltrated assembly is then cured to yield a strongly bonded part that has sufficient physical and mechanical properties for its intended purpose.

BRIEF DESCRIPTION OF THE DRAWINGS

For a further understanding of the nature and objects of the present invention reference should be made to the following description, taken in conjunction with the accompanying drawings which are not to scale and in which like parts are given like reference numerals, and wherein.

DETAILED DESCRIPTION

Figure 1:
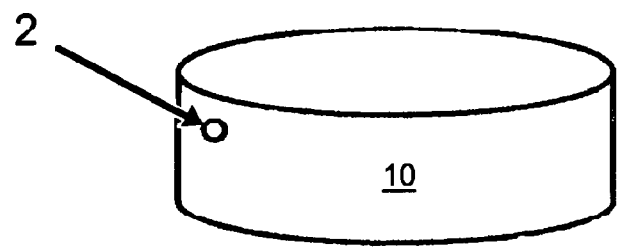
FIG. 1 is a pressed "green" metal or ceramic part.

The forming and assembly method is generally comprised of the following steps. Appropriate materials are formed into at least two separate parts in a manner that leaves a network of interconnecting porosity in each part. Each of the formed parts is then sintered such that each of the sintered parts continues to maintain a network of interconnecting porosity. Sintering is accomplished by heating the green part using any heating method suitable for sintering such as microwave energy, infrared, induction, kiln, furnace, or any other appropriate heating method until the particles of the pressed material fuse at the points of contact. The fusing creates a typical neck type structure or bond between adjacent particles. Sintering yields a much stronger part in comparison to a part that is not sintered. The sintered parts are then assembled together, after which a fill material is infiltrated into the assembled parts. The infiltrated assembled parts and fill material are then cured.

The fill material must be in liquid form at the time of its infiltration into the assembled parts. Fill material that must be melted prior to infiltration should have a melting point sufficiently less than the melting point of the material used to form the sintered parts so as to maintain the structural integrity of the assembled parts; typically, the melting point of the fill material is about two thirds of the melting point of the material used to form the sintered parts. If a melting step is required, the fill material may be heated by the use of microwave energy, infrared, induction, kiln, furnace or any other appropriate traditional heating methods.

The liquid fill material may be infiltrated into the assembled parts in various ways. For example, it may drip into the assembled parts by gravity feed if the fill material is placed above the assembled parts. It may be forced into the assembled parts under pressure. Alternatively, the liquid fill material may be drawn into the assembled parts by wicking or capillary action, or infiltrate the assembled parts in other ways. In cases where the liquid fill material does not naturally possess a property that will cause it to readily wet and wick into the sintered parts, a wetting or fluxing agent may be added to the fill material.

Curing the infiltrated assembled parts and fill material is accomplished in a manner consistent with the properties of the fill material. For example, metals and ceramics cure by solidifying. Polymers cure by polymerizing. Thermosets cure by setting up. Curing results in the formation of a chemical or mechanical bond in the infiltrate and sometimes between the infiltrate and assembled part.

The properties of the parts being formed, sintered and assembled can be selected by choosing the appropriate materials to form and densify the parts. These properties, which can be affected by the proper choice of materials include, but are not limited to, corrosion resistance, ductility, modulus, hardness, wear resistance, and lubricity. If metal or ceramic material is used for the parts, the fill material must have material compatibility with the metal or ceramic. These parts may be comprised of sintered metal and ceramic parts, metal and ceramic foam parts, perforated metal and ceramic parts, reinforcing fibers, or similar components, provided they have open interconnecting porosity or voids to allow the fill material to infiltrate the parts.

The method of the invention may also be applied to the assembly of metal foam, ceramic foam, perforated metal, and perforated ceramic parts that have the desired amount of open and interconnecting porosity. For these types of parts, sintering is not necessary. The parts are formed, assembled, infiltrated with the fill material, and the parts and fill material are then cured.

If greater structural strength is desired for the assembled part, an additional step of placing a structural fiber (fiber reinforcing material) (such as carbon, boron, or Kevlar® synthetic fiber) between the parts may be performed prior to infiltrating the material. For example, carbon fiber layers may be placed between alternating metal and ceramic sheets, as in the case of a laminated armor plate. Alternatively, the additional step may be performed by wrapping at least a portion, or all, of the assembled parts with a fiber reinforcing material and then infiltrating the fiber reinforcing material and assembled parts with fill material. For example, carbon fiber could be wrapped around a sintered metal or ceramic cylinder and then infiltrating the fill material. If necessary, the fiber reinforcing material may be placed between the parts and at least partially wrapped around the parts.

Figure 2:
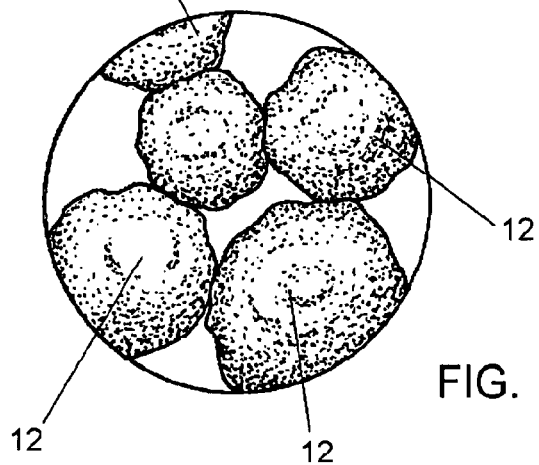
FIG. 2 is an enlarged view of an indicated section of FIG. 1.

One embodiment of the invention is described in the following way. Using powdered metals and/or ceramics that have the desired properties, individual parts are formed from particles using powder metallurgy and/or ceramic forming techniques that leave a network of interconnecting porosity in each part. A green pressed part 10 is illustrated schematically in FIG. 1. FIG. 2 is an enlarged view of indicated section 2 of FIG. 1 that illustrates the particles 12 that are pressed to form the part 10. It can be seen that the particles touch each other while leaving an open interconnecting porosity between them.

Figure 3:
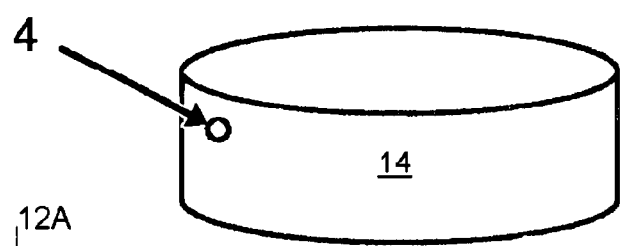
FIG. 3 is the same part as in FIG. 1 after sintering.
Figure 4:
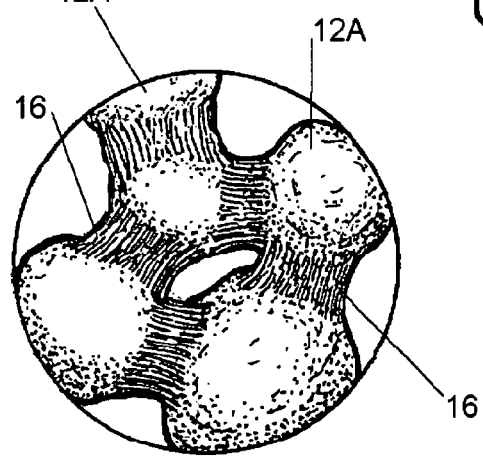
FIG. 4 is an enlarged view of an indicated section of FIG. 3.

Each part is then sintered, with the sintering processing resulting in a part preferably having approximately forty percent density and being approximately sixty percent open (typical). A sintered part 14 is illustrated schematically in FIG. 3. FIG. 4 is an enlarged view of indicated section 4 of FIG. 3 that illustrates particles 12 after they have been sintered to become sintered particles 12A. The sintered particles 12A are fused together, with the drawing illustrating the typical neck structure 16 of the fusing bond. It can be seen that the sintered particles 12A still leave the open interconnecting porosity between the particles, which provides space for a fill material.

Two or more separate sintered parts are assembled together and placed in a tray containing a selected molten fill material. The fill material has a melting point that is preferably no more than two thirds (typical) of the melting point of the material used to form the sintered parts. The entire assembly is heated and the molten fill material is drawn into the assembled sintered parts by wicking or capillary action. The assembly is then cured by cooling it until it solidifies. This method produces a single assembled part (from the previous two or more parts). The resulting part is fully or near-fully densified and bonded together in a single operation.

The inventive method provides several advantages as described below.

The method preserves the net shape capabilities of the powder metallurgy process for producing a green pressed part while yielding a bonded and fully or near-fully dense part.

The method can be used to manufacture net-shaped and near-net-shaped parts in various materials (ceramic, metals, and other materials) and to assemble and bond the parts together in a simple process with a great reduction of time and expense.

The method allows parts of many dissimilar materials with different properties to be easily assembled and bonded. As an example, parts having different CTE (coefficients of thermal expansion) can be joined together without the inherent bond weaknesses typically encountered with other joining methods for parts having different CTE. The flow of the fill material between the parts results in a bond that eliminates the typical problems of weakness, limited number of thermal cycles, and breakage typically encountered when joining parts having different CTE.

The method is suitable in the production of specialized parts. As an example, where a portion of an engine block does not need the strength of a solid metal piece, a void can be engineered into the engine block to reduce weight. One way to accomplish this is to form and sinter a first engine block part that has one side open to create the void. A second engine block part is formed and sintered that is designed to fit over the opening of the first part as a lid to seal shut the void. The second part is then assembled to the first part. The assembled parts are placed in a tray holding the molten fill material. The fill material is caused to wick into the assembled parts as described above. This process completely attaches and bonds the first and second parts together with an engineered void. There is no weakness at the bond in the final part that would normally result from using existing manufacturing methods.

The method reduces the number of steps normally required in this type of manufacturing.

The method results in a bonded region between two parts that is inherently free from porosity and buildup of contaminants and other problems that plague the bonded region created when using existing high temperature joining processes.

The method tends to draw the assembled parts tighter together. This phenomenon results from the fill material that forms the bond being infiltrated through the part as the bond is being formed and from the curing step.

The method provides for the fill material to flow through the interface of the two parts to be joined and into the bulk area of the part. This differs significantly from oven brazing or other traditional methods of joining parts, which occurs only at the interface of the two parts. This significant difference can be appreciated by imagining the taking of a transverse slice of the interface region and viewing it as a horizontal cut. The view of the joined region using the inventive method would appear as one single part without an interface, whereas the view of the joined region using brazing or other traditional method would appear as three distinct sections (two parts and a joint sandwiched between them).

The method can be used to improve the bonding characteristics of metals and ceramics and can produce a finished product with the combined benefits of both materials while reducing the number of steps required in comparison with traditional manufacturing processes. Some of the unique aspects of the method are: 1) the ability to take parts with different properties and characteristics and assemble them by flowing a fill material through them; 2) the bonding of ceramics and metals by creating a cermet bonded to a metal; 3) the method increases the surface area and bond quality between two parts; and 4) making precision-formed and sintered parts and simultaneously bonding and densifying them to create a net-shaped finished product.

The method of the invention may also be useful to utilize the elemental components of an alloy. An example is nickel-aluminum-bronze alloy which is used in applications where corrosion resistance is important. To manufacture an assembly using such material, the elemental components of the alloy (nickel, aluminum, copper, and iron, in this case) are segregated into 1) an alloy-proportionate quantity of those elements that raise the eutectic melting point of the alloy and 2) an alloy-proportionate quantity of those elements that lower the alloy's eutectic melting point. Those elements that raise the eutectic melting point (nickel 5.5 wt % of total, iron 5 wt % of total, and copper 29.5 wt % of total melt point ~1400C) are sintered into a porous powdered metal body. The other elements (copper 45 wt % of total, and aluminum 15 wt % of total, melt point ~925 C) are then melted and allowed to infiltrate into the porous metal body formed from nickel/iron/copper/aluminum. By holding the temperature of the assembly at elevated temperature, the fill material (with a lower melting point) actually diffuses into the surface of the sintered parts, creating the desired alloy for some depth in the part. If allowed to continue for very long heating periods, the entire structure would become homogeneously alloyed (the diffusion process is controlled by Ficks Law Equations). However, much of the benefit of the alloy can be achieved much more economically by only heating long enough to achieve a desired degree of diffusion (alloying).

The use of materials other than metal as the fill material, such as an epoxy or thermoset, to join the sintered materials would facilitate the ease of room temperature assembling and joining while still achieving good bond strength because of the excellent mechanical and physical bond and great amount of bonding surface area. As stated, the fill material need not be an epoxy or thermoset to realize the benefits of the inventive method.

Hydroxyapatite is an example of a fill material that is not a metal, epoxy, or thermoset. The following is an example of using hydoxyapatite as a fill material in a medical application. Sintered titanium metal parts incorporated with a hydroxyapatite fill material could be used for medical implants. Hydroxyapatite is a biomaterial that is able to bond chemically to bone. Thus, this would encourage good osteogenic bone attachment to the medical implant. Using this approach, it would be possible to functionalize the surface of such an implant with a photo-polymerizable fill material and make an immediate bond to bone by ultraviolet (UV) curing. This temporary bond of bone-to-implant could be replaced by a permanent mechanical bond as the osteogenic bone growth penetrated the temporary interface.

Figure 5:
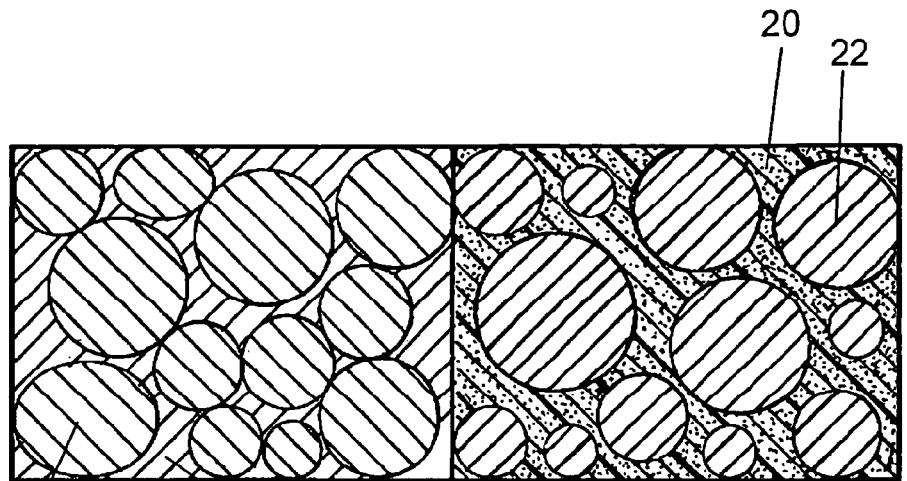
FIG. 5 is a sectional view that illustrates an example of the use of the invention.

FIG. 5 illustrates the use of the invention wherein a sintered powder metal part 18 and porous part 20 have been infiltrated with a selected metal 22. The porous part 20 is intended to be generally representative of parts formed from metal foam, ceramic foam, perforated metal, or perforated ceramic.

Figure 6:
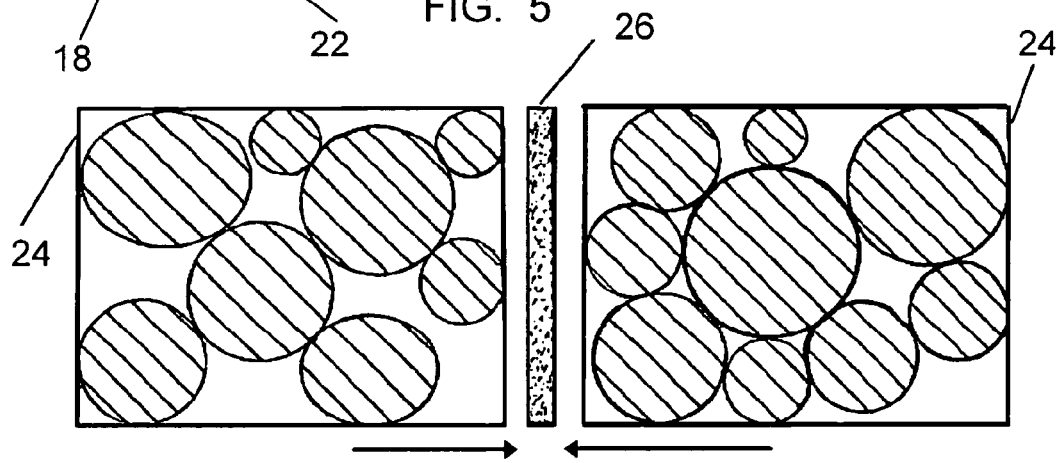
FIGS. 6 and 7 are section views that illustrate the use of the invention with a fiber reinforcing material between the parts.
Figure 7:
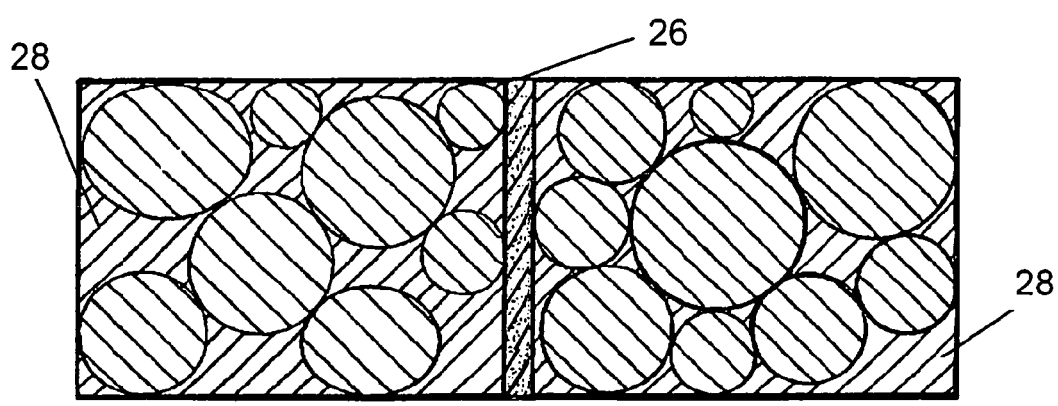

FIG. 6 illustrates the use of the invention wherein a fiber reinforcing material 26 has been placed between the two parts 24. FIG. 7 illustrates the two sintered metal powder parts 24 after they have been assembled and infiltrated with a selected metal 28.

Figure 8:
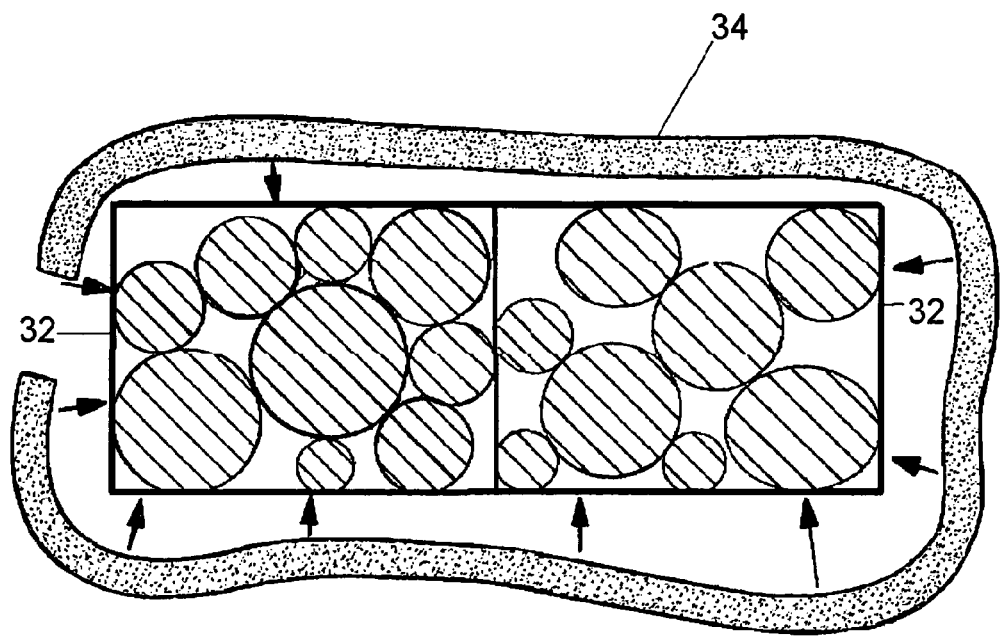
FIGS. 8 and 9 are section views that illustrate the use of the invention with a fiber reinforcing material wrapped around the parts.
Figure 9:
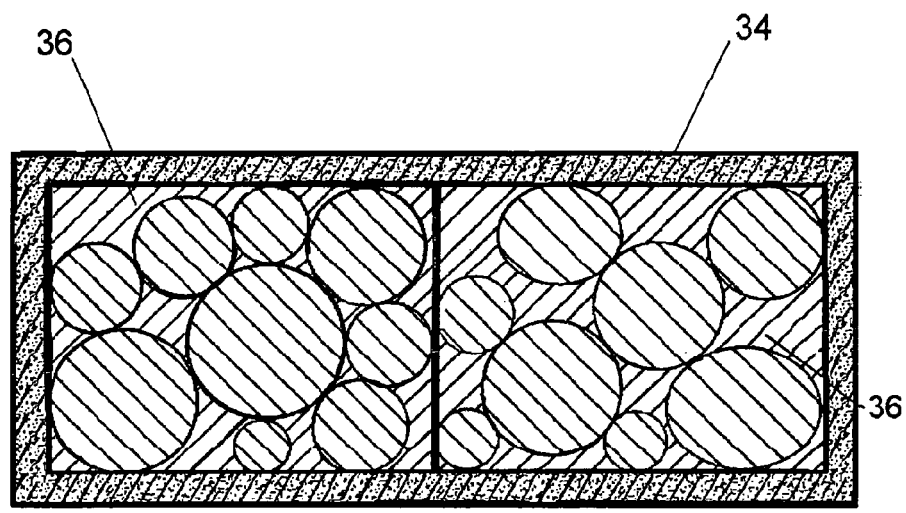

FIG. 8 illustrates the use of the invention wherein two parts 32 have been wrapped with a fiber reinforcing material 34. FIG. 9 illustrates the two parts 30 infiltrated with a selected metal 36.

It should be understood that a solid or dotted line is shown in the FIG. 5 described above only for ease of illustrating the separately formed parts and that, as described above, infiltration of the fill material will effectively cause a cross section of the assembled and bonded parts to appear as one.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed is:

1. A method of forming and assembling at least two parts together, comprising the steps:
   a. forming at least two separate parts comprised of metal foam having at least 60% open and interconnecting porosity throughout each part and having an assembly interface;
   b. assembling the parts at the assembly interface;
   c. causing a fill material to be infiltrated substantially throughout the open and interconnecting porosity of the assembled parts to form an infiltrated assembly; and
   d. curing the infiltrated assembly,
wherein the at least two separate parts are formed and assembled without sintering the at least two separate parts or the assembled parts.

2. The method of claim 1 wherein the two separate parts have different coefficients of thermal expansion at the assembly interface.

3. A method of forming and assembling at least two parts together, comprising the steps:
   a. forming at least two separate parts comprised of ceramic foam having open and interconnecting porosity throughout each part;
   b. assembling the parts;
   c. causing a fill material to be infiltrated substantially throughout the open and interconnecting porosity of the assembled parts to form an infiltrated assembly; and
   d. curing the infiltrated assembly.

4. The method of claim 3 wherein the at least two separate parts are formed and assembled without sintering the at least two separate parts or the assembled parts.

5. The method of claim 3 wherein the at least two separate parts are formed with at least 60% open porosity.

6. A method of forming and assembling at least two parts together, comprising the steps:
   a. forming two separate parts comprising perforated metal having at least 60% open and interconnecting porosity throughout each part;
   b. assembling the parts;
   c. causing a fill material to be infiltrated substantially throughout the open and interconnecting porosity of the assembled parts to form an infiltrated assembly; and
   d. curing the infiltrated assembly,
wherein the at least two separate parts are formed and assembled without sintering the at least two separate parts or the assembled parts.

7. A method of forming and assembling at least two parts together, comprising the steps:
   a. forming at least two separate parts comprised of perforated ceramic having open and interconnecting porosity throughout each part;
   b. assembling the parts;
   c. causing a fill material to be infiltrated substantially throughout the open and interconnecting porosity of the assembled parts to form an infiltrated assembly; and
   d. curing the infiltrated assembly.

8. The method of claim 7 wherein the at least two separate parts are formed and assembled without sintering the at least two separate parts or the assembled parts.

9. The method of claim 7 wherein the at least two separate parts are formed with at least 60% open porosity.

10. A method of forming and assembling at least two parts together, comprising the steps:
    a. forming at least two separate parts using ceramic forming techniques in a manner that leaves a network of interconnecting porosity throughout each part;
    b. sintering each formed part such that each of the sintered parts continues to maintain the network of interconnecting porosity;
    c. assembling the sintered parts together at an assembly interface to form assembled parts;
    d. causing a fill material to be infiltrated substantially throughout the open and interconnecting porosity of the assembled parts to form an infiltrated assembly; and
    e. curing the infiltrated assembly.

11. The method of claim 10 wherein the two separate parts have different coefficients of thermal expansion at the assembly interface.

12. The method of claim 10 wherein the at least two separate parts are formed with at least 60% open porosity.

13. A method of forming and assembling at least two parts together, comprising the steps:
    a. forming at least two separate parts comprised of perforated metal and metal foam, each part having at least 60% open and interconnecting porosity throughout each part;
    b. assembling the parts;
    c. causing a fill material to be infiltrated substantially throughout the open and interconnecting porosity of the assembled parts to form an infiltrated assembly; and
    d. curing the infiltrated assembly,
wherein the at least two separate parts are formed and assembled without sintering the at least two separate parts or the assembled parts.

14. A method of forming and assembling at least two parts together, comprising the steps:
    a. forming at least two separate parts comprised of perforated ceramic and ceramic foam, each part having open and interconnecting porosity throughout each part;
    b. assembling the parts;
    c. causing a fill material to be infiltrated substantially throughout the open and interconnecting porosity of the assembled parts to form an infiltrated assembly; and
    d. curing the infiltrated assembly.

15. The method of claim 14 wherein the at least two separate parts are formed and assembled without sintering the at least two separate parts or the assembled parts.

16. The method of claim 14 wherein the at least two separate parts are formed with at least 60% open porosity.

* * * * *